(12) United States Patent  (10) Patent No.: US 7,597,072 B2
Stein et al.  (45) Date of Patent: Oct. 6, 2009

(54) SYSTEM AND METHOD FOR OPERATING A MULTIPLE FUEL ENGINE

(75) Inventors: Robert A. Stein, Saline, MI (US); Stephen L. Hahn, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 23 days.

(21) Appl. No.: 11/552,310

(22) Filed: Oct. 24, 2006

(65) Prior Publication Data

US 2008/0092834 A1  Apr. 24, 2008

(51) Int. Cl.
*F01L 1/34* (2006.01)

(52) U.S. Cl. .................. 123/90.15; 123/90.17; 123/304; 123/403; 123/577

(58) Field of Classification Search ............. 123/90.15, 123/90.16, 90.17, 90.18, 304, 345, 346, 347, 123/348, 403, 577, 575
See application file for complete search history.

(56) References Cited

U.S. PATENT DOCUMENTS

| | | | |
|---|---|---|---|
| 4,884,530 A * | 12/1989 | Boekhaus et al. | 123/1 A |
| 5,188,087 A | 2/1993 | Saito | |
| 5,233,948 A | 8/1993 | Boggs et al. | |
| 5,682,854 A | 11/1997 | Ozawa | |
| 6,332,448 B1 * | 12/2001 | Ilyama et al. | 123/304 |
| 6,609,364 B2 * | 8/2003 | Litorell et al. | 60/274 |
| 6,837,040 B2 * | 1/2005 | Sonoda et al. | 60/284 |
| 6,837,199 B2 | 1/2005 | Matsuura et al. | |
| 6,968,825 B2 * | 11/2005 | Hitomi et al. | 123/406.11 |

* cited by examiner

*Primary Examiner*—Ching Chang
(74) *Attorney, Agent, or Firm*—Allan J. Lippa; Alleman Hall McCoy Russell & Tuttle LLP

(57) ABSTRACT

A system and method to control valve timing and valve lift of an engine is described. The valve timing can be adjusted to improve engine operation when a range of fuels are used. The method can improve engine performance and the energy utilization, at least under some conditions.

15 Claims, 9 Drawing Sheets

SYSTEM AND METHOD FOR OPERATING A MULTIPLE FUEL ENGINE

FIELD

The present description relates to a method for controlling an engine having the ability to operate using different types of fuel. The method can improve engine performance and efficiency.

BACKGROUND

One method to operate an internal combustion engine is described in U.S. Pat. No. 5,682,854. This patent presents a method for changing engine operating modes between Otto cycle operation and Miller cycle operation. The method adjusts intake and exhaust valve opening times in response to requested engine load. At light loads, the valve timings may be set so that the engine operates in an Otto cycle. At higher loads, the valve timings may be set so that the engine operates in a Miller cycle. The inventors of this method claim that it can reduce engine NOx and knock.

The above method also has several disadvantages. Namely, the method changes the engine operating mode based simply on the driver load demand. In addition, the method does not appear to consider that fuel type and/or properties may influence the desired mode of operation. Further, the method reduces the effective compression ratio at higher engine loads and therefore reduces the engine output that may be achieved.

SUMMARY

One embodiment of the present description includes a method for controlling combustion of different fuels in an internal combustion engine, the method comprising: increasing the amount of valve closing timing retard of an intake valve during a cycle of a cylinder as the concentration of a lower octane fuel increases in a fuel that is combusted in said cylinder, said valve closing time retarded from at least bottom-dead-center of the intake stroke of said cylinder. This system and method overcome at least some of the limitations of the previously mentioned method.

When an internal combustion engine is operated using more than one type of fuel, the operation of the engine can be improved by varying the valve timing of higher compression ratio cylinders as fuel properties vary. For example, an engine can be built with at least one higher compression ratio cylinder to improve engine power output. Higher octane fuels may be combusted in the higher compression cylinder(s) so that the propensity of engine knock is reduced. However, if the higher compression cylinder is operated with a lower octane fuel, cylinder valve timing may be adjusted so that the effective cylinder compression ratio is reduced, thereby allowing a higher compression ratio cylinder to combust a lower octane fuel with less susceptibility to knock. To increase engine output, the engine cylinders having a higher compression ratio may be operated in an Otto cycle mode when a higher octane fuel is combusted (e.g., alcohol or a gasoline-alcohol blend). And, to reduce the possibility of engine knock, the same cylinders may be operated in an Atkinson cycle mode when combusting a lower octane fuel (e.g., gasoline). Operating cylinders in this manner allows an engine to take advantage of different fuel properties. Specifically, alcohol is a fuel that has a lower energy density than gasoline, so more alcohol is necessary to produce the same amount of work as a given amount of gasoline. However, alcohol is also less susceptible to producing engine knock because it has higher octane and because it has increased charge cooling capacity when compared to many types of gasoline. Consequently, an engine can be operated on alcohol at a compression ratio of 14:1 without producing engine knock. Operating an engine at this compression ratio allows an engine to recover some of the energy difference between the two fuels, thereby increasing the energy utilization of alcohol. In other words, when alcohol is combusted in a 14:1 compression ratio cylinder, less fuel is needed to produce an amount of torque that is equivalent to the amount of torque that is produced when a similar cylinder is operated with alcohol at a 10:1 compression ratio. On the other hand, if gasoline is combusted in a cylinder having a compression ratio of 14:1, cylinder knock is likely to occur and engine performance may degrade. The present method overcomes these limitations by operating the engine in an Otto cycle when higher octane fuel is combusted and by operating in an Atkinson cycle when the fuel octane is lower. The higher compression Otto cycle allows the engine to improve the performance and economy of combusting an alcohol fuel while the Atkinson cycle allows the engine to operate with a lower effective compression ratio when gasoline is combusted, thereby reducing the tendency for engine knock.

The present description may provide several advantages. Specifically, the engine system can provide increased performance when operated with a higher octane fuel and increased efficiency when operated with a lower octane fuel, at least at some operating conditions. Further, the system can improve the energy utilization from a given amount of fuel by adjusting a cylinder's effective compression ratio. Further still, the system can increase engine output at higher loads and reduce the susceptibility of engine knock when an engine is operated at a higher compression ratio and combusting a lower octane fuel.

The above advantages and other advantages, and features of the present description will be readily apparent from the following detailed description of the preferred embodiments when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein.

DETAILED DESCRIPTION

Figure 1:
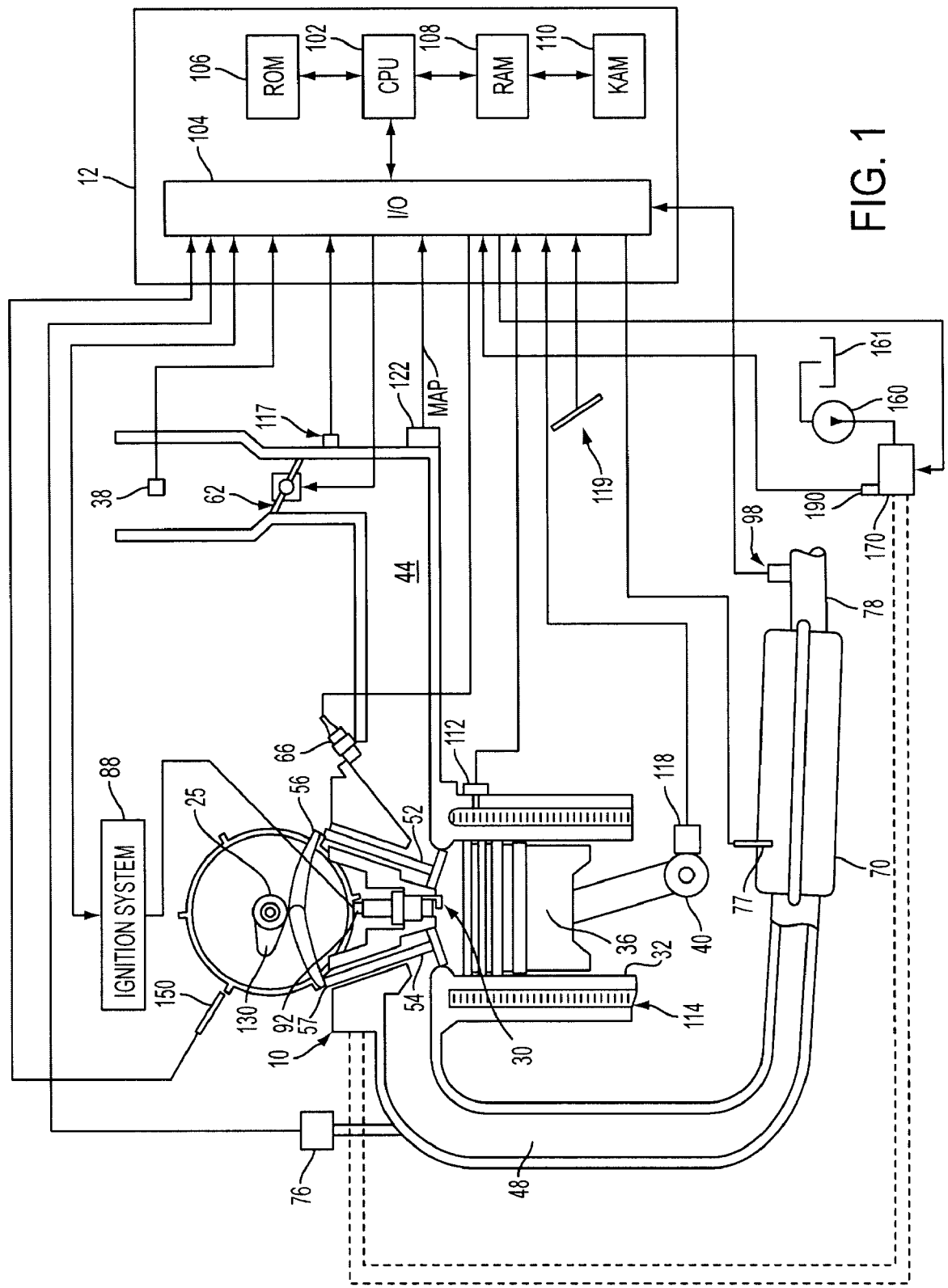
FIG. 1 is a schematic diagram of an engine.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is known communicating with intake manifold 44 and exhaust manifold 48 via respective intake valve 52 and exhaust valve 54. Cam phase actuator 25 is shown coupled to camshaft 130. Oil reservoir 161 supplies oil to pump 160, pressurized oil is supplied from the pump to cam phase actuator 25 via valve 170 based on commands from engine controller 12. Camshaft 130 is constructed with at least two intake cam lobe profiles and at least one exhaust cam lobe profile. The intake cam lobe profiles may have different lift amounts, different durations, and may be phased differently (i.e., the cam lobes may vary in size and in orientation with respect to one another). Alternatively, the system may utilize separate intake and exhaust cams. Cam position sensor 150 provides cam position information to controller 12. The intake cam lobe profiles include a lower lift profile and a higher lift profile. Intake valve rocker arm 56 and exhaust valve rocker arm 57 transfer valve opening force from the camshaft to the respective valve stems. Intake rocker arm 56 includes a lost motion member for selectively switching between lower and higher lift cam lobe profiles. A hydraulically actuated pin (not shown) selectively couples the rocker arms together activating or deactivating the higher lift cam profile based on a control signal from controller 12. Alternatively, different valvetrain actuators and designs may be used in place of the design shown (e.g., pushrod instead of overhead cam, electro-mechanical instead of hydro-mechanical).

Intake manifold 44 is also shown having fuel injector 66 coupled thereto for delivering liquid fuel in proportion to the pulse width of a signal from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. Further, fuel may be injected directly into the cylinder and to the intake port. Further still, different fuel types may be injected into the cylinder and the port. In addition, intake manifold 44 is shown communicating with optional electronic throttle 62.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust pipe 78 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random-access memory 108, keep-alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 119 coupled to an accelerator pedal; a measurement of oil pressure supplied to cam phase mechanism 25 from sensor 190; a measurement of engine manifold pressure (MAP) from pressure sensor 122 coupled to intake manifold 44; engine knock sensor (not shown); fuel type sensor (not shown); humidity from humidity sensor 38; a measurement (ACT) of engine air temperature or manifold temperature from temperature sensor 117; and an engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

Figure 2A:
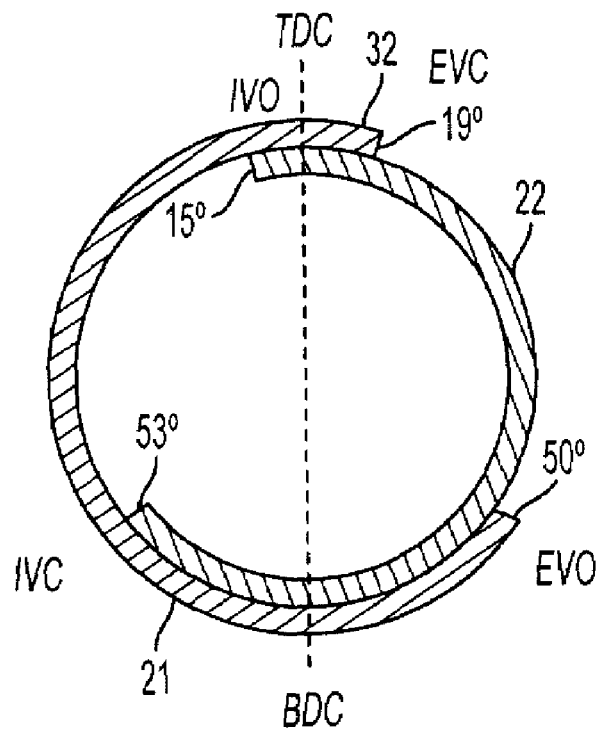
FIG. 2A is an example diagram showing the valve overlap and valve timing of an engine operating with Otto cycle valve timing.

Referring now to FIG. 2A, an exemplary diagram of nominal valve overlap and valve timing for an engine operating in an Otto cycle is shown. This diagram depicts an example higher lift valve profile where the intake valve opening duration is increased to improve engine breathing. Exhaust valve open timing is represented by the outer ring 21. Intake valve open timing is represented by the inner ring 22. The valve timings are referenced to cylinder positions top-dead-center (TDC) and bottom-dead-center (BDC). Notice, the valve overlap period from intake valve opening (IVO) to exhaust valve closing (EVC) is roughly centered about TDC. Intake valve closing (IVC) and exhaust valve opening (EVO) are roughly centered about BDC. Specifically, IVO is set to 15° before top-dead-center, IVC is set to 53° after bottom-dead-center, EVO is set to 50° before bottom-dead-center, and EVC is set to 19° after top-dead-center. These valve timings may be set to provide a compromise between engine performance, emissions, and fuel economy throughout the engine operating range.

Note that the timings shown in FIG. 2A may also be advanced or retarded depending on control objectives. Further, the cam lobe lift durations may vary from those shown and the beginning and ending positions of the lift portion of the lobes may also vary with respect to the cam lobes. In addition, the intake and exhaust valve phase timing (i.e., the valve opening and closing times with respect to a particular crankshaft position) may be adjusted individually or simultaneously in response to engine operating conditions.

Figure 2B:
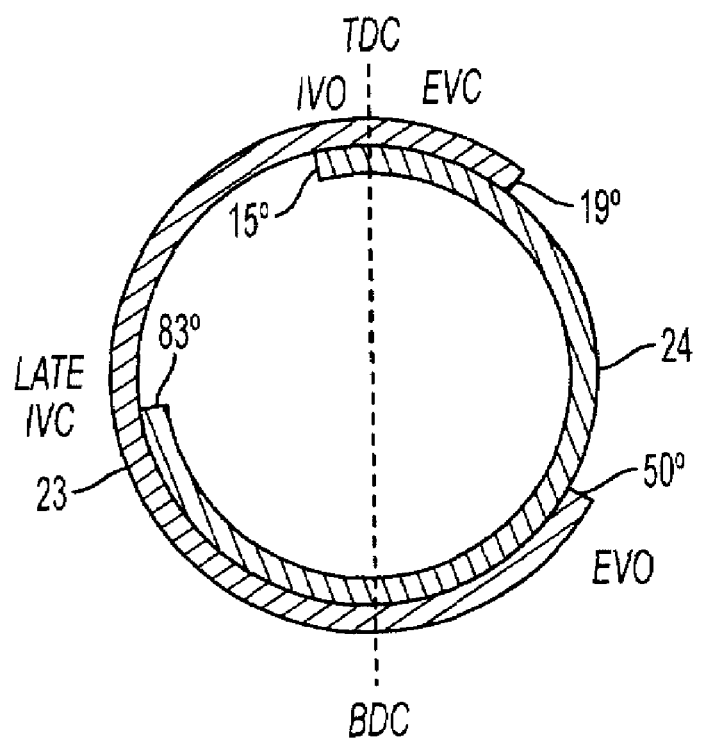
FIG. 2B is an example diagram showing valve overlap and valve timing of an engine operating with Atkinson cycle valve timing.

Referring to FIG. 2B, an example diagram of retarded or late engine intake valve timing for an engine operating in an Atkinson cycle is shown. In one example, exhaust valve timing can be fixed while the intake valve timing can be adjusted by switching between cam lobe profiles, for example. In this example, IVO and EVC are roughly centered about top-dead-center of the intake stroke. IVC has been retarded from the Otto cycle timing example to 830 by extending the duration of the intake cam lobe. Retarding the IVC location allows some of the cylinder charge to be expelled into the intake manifold during the first part of the compression stroke, thereby reducing the effective compression ratio of the cylinder (Note: The effective compression ratio is the combustion chamber volume where the intake valve closes relative to the combustion chamber volume at top-dead-center with valves closed, the geometric compression ratio is the combustion chamber volume at bottom-dead-center relative to the combustion chamber volume at top-dead-center). IVO is set to 15° before top-dead-center, EVO is set to 50° before bottom-dead-center, and EVC is set to 19° after top-dead-center. In an alternative configuration, the cam profile may be switched and the intake phase may also be adjustable with respect to a given crankshaft position. This combination allows the effective compression ratio to be further reduced by retarding the intake cam.

On the other hand, the benefits of retarded valve timing can be limited during some conditions. For example, for an engine having a single intake cam profile, the profile is often a compromise between idle stability and fuel consumption at lower engine speeds versus engine performance at higher speeds and loads. When a fixed lift cam is retarded to improve part load engine operation, the amount of cam retard can be limited by combustion stability. That is, if the cam is retarded beyond a certain amount, the engine emissions, engine noise, and engine vibration may degrade as cylinder conditions cause characteristics of combustion (e.g., temperature, pressure, air-fuel mixing, and burn rate) to vary. By providing different valve lift profiles for different operating conditions, it is possible to increase the amount of cam retard during part load engine operating conditions. The lower lift cam profile can improve combustion stability and reduce engine emissions at lower engine speeds because the cylinder air-fuel charge is mixed better and combusts more uniformly. Further, the lower lift cam profile provides a way to reduce the effective overlap between the intake valve and the exhaust valve even though the exhaust lobe and the intake valve lobe may be driven from the same camshaft.

In another example, the valve lift and/or the valve timing can be adjusted individually for intake and/or exhaust valves (dual independent cam timing) to achieve the illustrated timing. This type of system allows the intake and exhaust valve timing to be retarded while valve overlap can be set positive (i.e., the intake and exhaust valve are simultaneously open) or negative (i.e., no overlap between the valves).

Returning to FIG. 2B, the exhaust valve open timing is represented by outer ring 23. Intake valve open timing is represented by inner ring 24. As mentioned above, the valve timings are referenced to cylinder positions top-dead-center (TDC) and bottom-dead-center (BDC). The valve overlap period from intake valve opening (IVO) to exhaust valve closing (EVC) is roughly centered about TDC. Intake valve closing (IVC) and exhaust valve opening (EVO) are centered after BDC, at roughly 17° after bottom-dead-center (ABDC).

The valve timing shown in FIGS. 2A and 2B are examples of intake and exhaust valve timing. Accordingly, alternate intake and exhaust valve timings are possible that may provide a compromise between performance and fuel economy throughout the engine operating range. For example, retarded intake valve closing locations may occur within the range of 30° after BDC to more than 100° after BDC intake stroke of a respective cylinder. Specifically, the valve timings may be set so that an effective compression ratio range between 8.5:1 and 14.5:1 may be achieved. Of course, different embodiments of the present description may narrow or widen the range of effective compression ratio (e.g., one example may allow an effective compression ratio adjustment between 9:1 and 15:1 while another example may allow a range of adjustment between 8:1 and 12.5:1). Further, the valve timings may be set to achieve any range of compression ratios between those mentioned.

While retarded intake valve closing locations may occur within the range of 30° after BDC to more than 1000 after BDC (intermediate angles between the above intake and exhaust timing angles are also possible). Combinations and sub-combinations of intake opening and exhaust valve closing locations may be used to achieve a desired emission, fuel economy, and/or performance level. As such, the illustration is not meant to limit the breadth or scope of this disclosure.

Figure 2C:
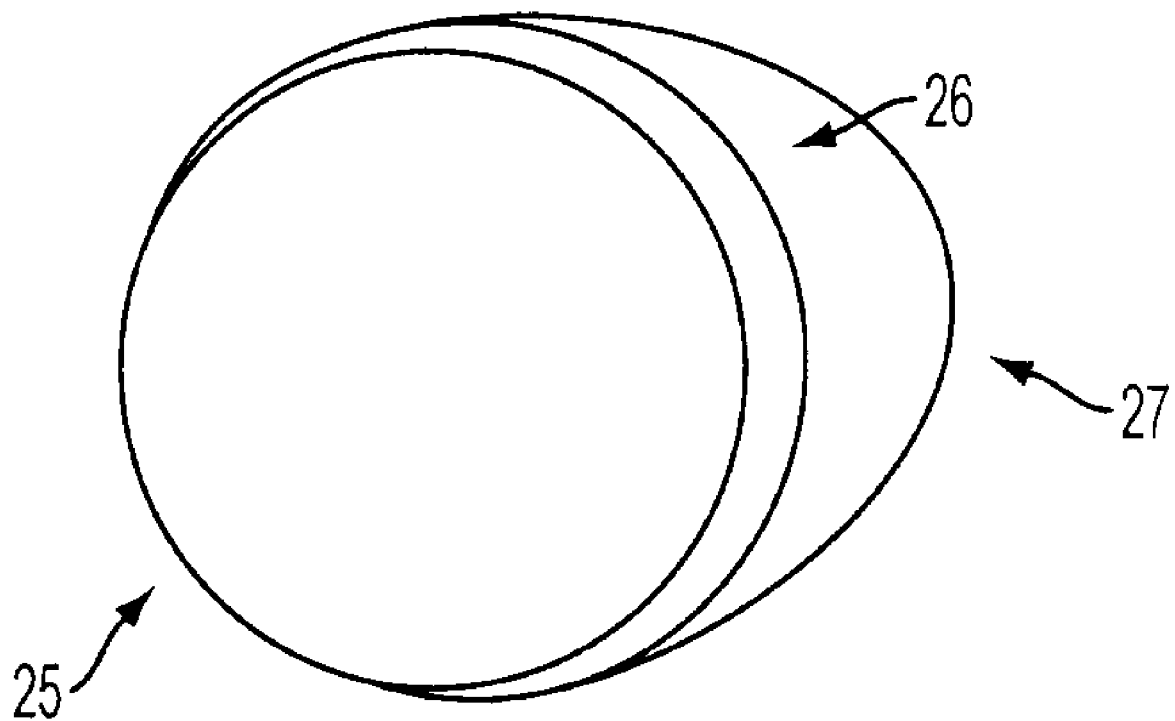
FIG. 2C is an example schematic diagram of a camshaft cross section that has two different lobe profiles.

Referring now to FIG. 2C, a cross sectional schematic of an example two cam lobe profile is shown. Marker 25 represents the base circle for the example cam. The intake valve remains closed while the rocker arm rests on the base circle. Marker 26 represents a lower lift cam lobe that has a longer duration than the higher lift cam lobe 27. Valve lift is reduced and valve opening duration is increased when a rocker arm follows the lower lift profile. Valve lift is increased and valve opening duration is reduced when a rocker arm follows the higher lift profile.

Also note that electrically actuated valves may be operated at the timings illustrated by FIGS. 2A and 2B. In addition, different valves or different lift control strategies may be used to vary the lift of electrically actuated valves to achieve control that is similar to that illustrated.

Figure 3:
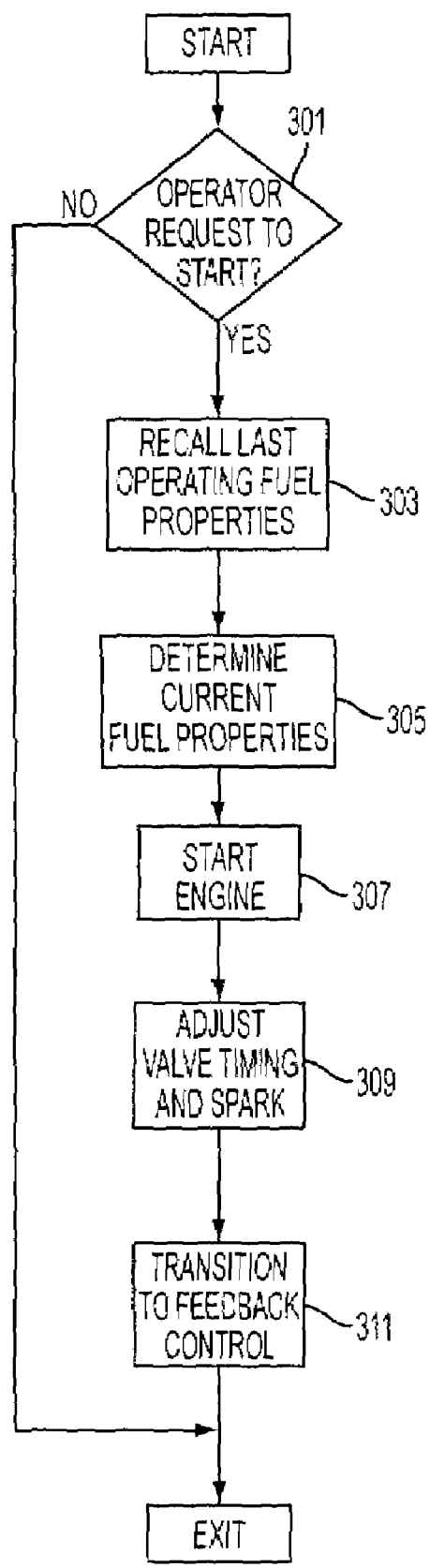
FIG. 3 is an example flow diagram showing a starting sequence for an engine that may be operated using multiple fuels.

Referring now to FIG. 3, an example flow chart of an engine starting sequence for a multiple fuel engine is shown. In step 301, the routine determines if there is a request to start the engine. The request to start may be made by an operator or by part of an automated system, a hybrid vehicle controller for example. If a request to start has been made the routine proceeds to step 303. Otherwise, the routine proceeds to exit.

In step 303, the fuel properties (e.g., the concentration of alcohol in a fuel, fuel volatility, fuel vapor pressure, and/or octane) of the fuel that the engine last combusted are recalled from memory. The fuel properties can be retrieved from sensors that measure fuel properties and/or from inferences made from sensors that measure other engine operating characteristics and then are used to determine fuel properties. For example, U.S. Pat. No. 6,588,253 provides one method to determine the alcohol content of a fuel and is hereby fully incorporated by reference, while U.S. Pat. No. 5,467,755 provides a method for determining the effect different alcohol fuel concentrations on engine air-fuel control and a method for compensating for such effects, and is also hereby fully incorporated by reference. Parameters reflecting the properties of fuel being combusted prior to stopping an engine are retrieved from memory before the engine is started. The routine proceeds to step 305.

In step 305, the present fuel properties are determined from available sensor information. Before an engine is started, or shortly thereafter, fuel sensors can be interrogated so that the type of fuel that is about to be delivered to the engine can be determined. Different types of sensors may be used to determine fuel properties. These sensors may operate based on optical or electrical characteristics (e.g., capacitive or wavelength transmissibility) and as such are not meant to limit the scope or breadth of this disclosure. Further, in some embodiments, a fuel type sensor may be eliminated if desired. The routine proceeds to step 307.

In step 307, the engine is started. Fuel properties from steps 305 and 307 are used to prepare the engine for starting. If steps 305 and 307 indicate substantially the same fuel properties then the fuel injection timing, valve profile, valve phase, and spark timing are set in response to the fuel properties. For example, for a given ambient air pressure, ambient air temperature, and engine temperature an amount of fuel is determined by indexing a table of empirically determined fuel amounts that produce the desired starting characteristics. Spark timing, cam profile, and cam phasing settings are determined in a similar manner, however, cam timing devices that are indexed using pressurized engine oil may be pinned or held in place by a locking mechanism until engine oil pressure is established. Typically, the base valve lift is set to a lower profile, and the cam phase is retarded so that the effective engine compression ratio is below the engine's highest achievable compression ratio. For example, for an engine having a 14:1 geometric compression ratio, the valve timing and lift can be set in an Atkinson cycle mode so that the effective compression ratio is 12.5:1 or lower. By lowering the starting compression ratio, a smaller starter can be used to crank the engine during starting. In addition, reducing the effective compression ratio may reduce engine knock if the engine is restarted when hot and when being fueled with a lower octane fuel. Lowering the compression ratio during starting may also reduce starting emissions because less fuel may be pushed between the piston and the cylinder wall and because pushing a fraction of the cylinder contents back into the intake manifold may also reduce engine warm-up time and improve fuel vaporization. The base cam profile and cam phase can be set when an engine stop request is made so that the valves are in a "ready" state when the engine is subsequently started.

In another embodiment, systems that are capable of adjusting valve timing while the engine is stopped (e.g., electrically actuated valves) may adjust valve operation before and/or during engine starting. In one example, the concentration of alcohol may be used to index a function or table that defines valve timing during a start. The valves may be timed in an Atkinson cycle such that the compression ratio is limited in response to the concentration of alcohol in the engine fuel. In other words, the concentration of alcohol can be used to adjust the intake valve timing retard so that the amount of cylinder contents that is pushed back into the intake manifold is controlled in response to the alcohol concentration. The valve timings may be empirically determined and stored in tables that are indexed using engine speed and engine load, for example.

The engine is started after setting the predetermined spark timing, valve timing, valve lift, and fuel amount. The routine proceeds to step 309.

In step 309, valve timing and spark timing are set in response to engine operating conditions. In one embodiment, engine oil pump 160 develops pressure as the engine rotates and achieves idle speed. When the oil pressure reaches a predetermined level, the cam phase and lift amounts may be varied according to the concentration of alcohol in the fuel, engine operating conditions, and the operator torque demand, for example. In one example, cam lift and phase are determined by using engine speed, load, and fuel properties to index empirically determined tables or functions. The routine proceeds to step 311.

In step 311, the system transitions to a control mode that utilizes engine sensor feedback to control engine spark, valve timing, valve lift, and fuel amount. This mode is described by the method of FIG. 5. The routine proceeds to exit.

Figure 4:
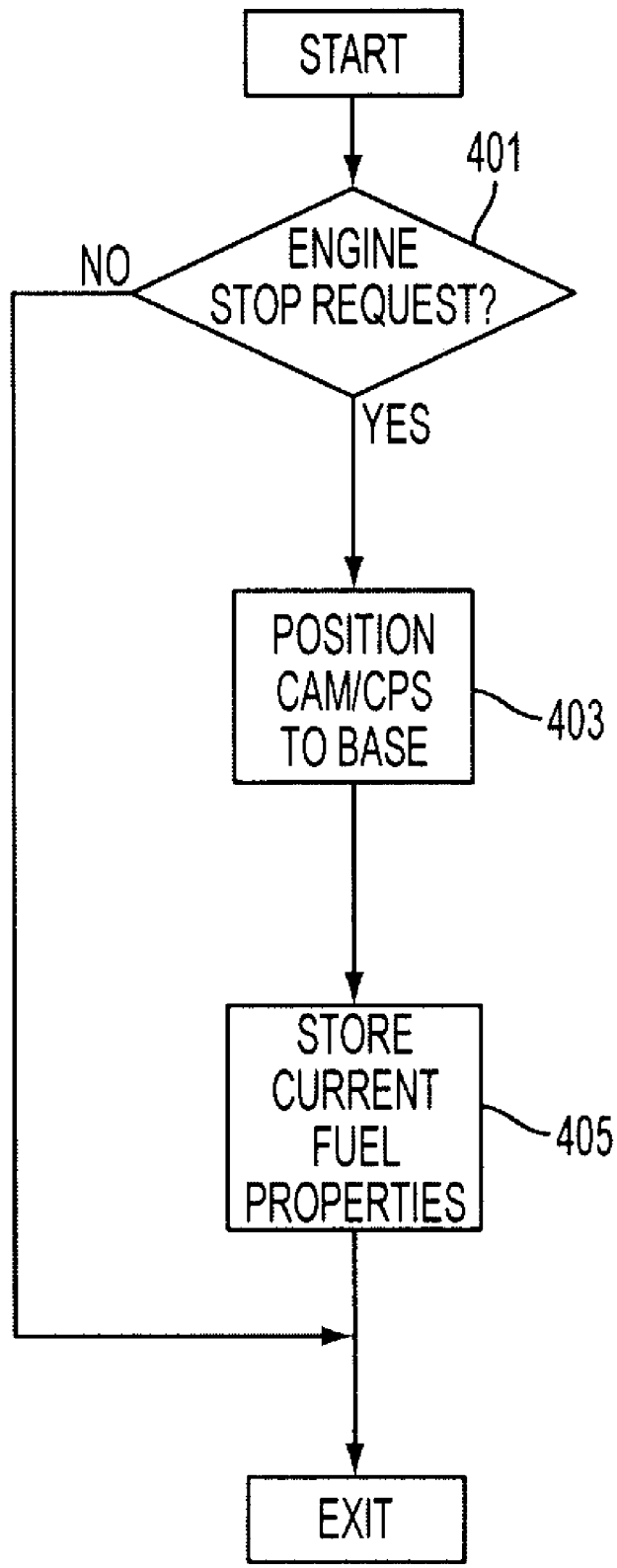
FIG. 4 is an example flow diagram showing a stopping sequence for an engine that may be operated using multiple fuels.

Referring now to FIG. 4, an example flow diagram of a stopping sequence for a cylinder that may be operated on multiple fuels is shown. In step 401, the routine determines if there has been a request to stop the engine. An engine stop request may be made by an operator or by another means such as another control system (e.g., a hybrid powertrain controller). If there is a request to stop the engine, the routine proceeds to step 403. Otherwise, the routine exits.

In step 403, the cam phase and cam profile are set to a base position. The cam profile is set to a lower lift position that may have a longer duration. This profile makes it possible to retard the intake valve closing time so that at least some of the cylinder contents are pushed back into the intake manifold, thereby reducing the cylinder's effective compression ratio.

The cam phase can be set to a position that depends in part on the desired compression ratio at start and the cam lobe profile. For example, the lower lift cam profile can be designed to account for a variety of considerations, such as the desired higher limit compression ratio, the desired lower limit compression ratio, and the range of the cam phase adjustment device. As such, the intake valve opening duration may vary as the operating objectives vary. Therefore, the base cam phase is set to a position that allows the engine to be started at an effective compression ratio that is less than the geometric compression ratio. Typically, the effective compression ratio is set lower than 12.5:1 so that the engine may be restarted with less possibility of producing knock, even when the engine is started at a warm temperature. The routine proceeds to step 405.

In step 405, the current fuel properties are saved to memory. The fuel properties and/or parameters may be determined by the above-mentioned methods or by other known methods and are saved upon an engine stop request. The routine proceeds to exit.

Figure 5:
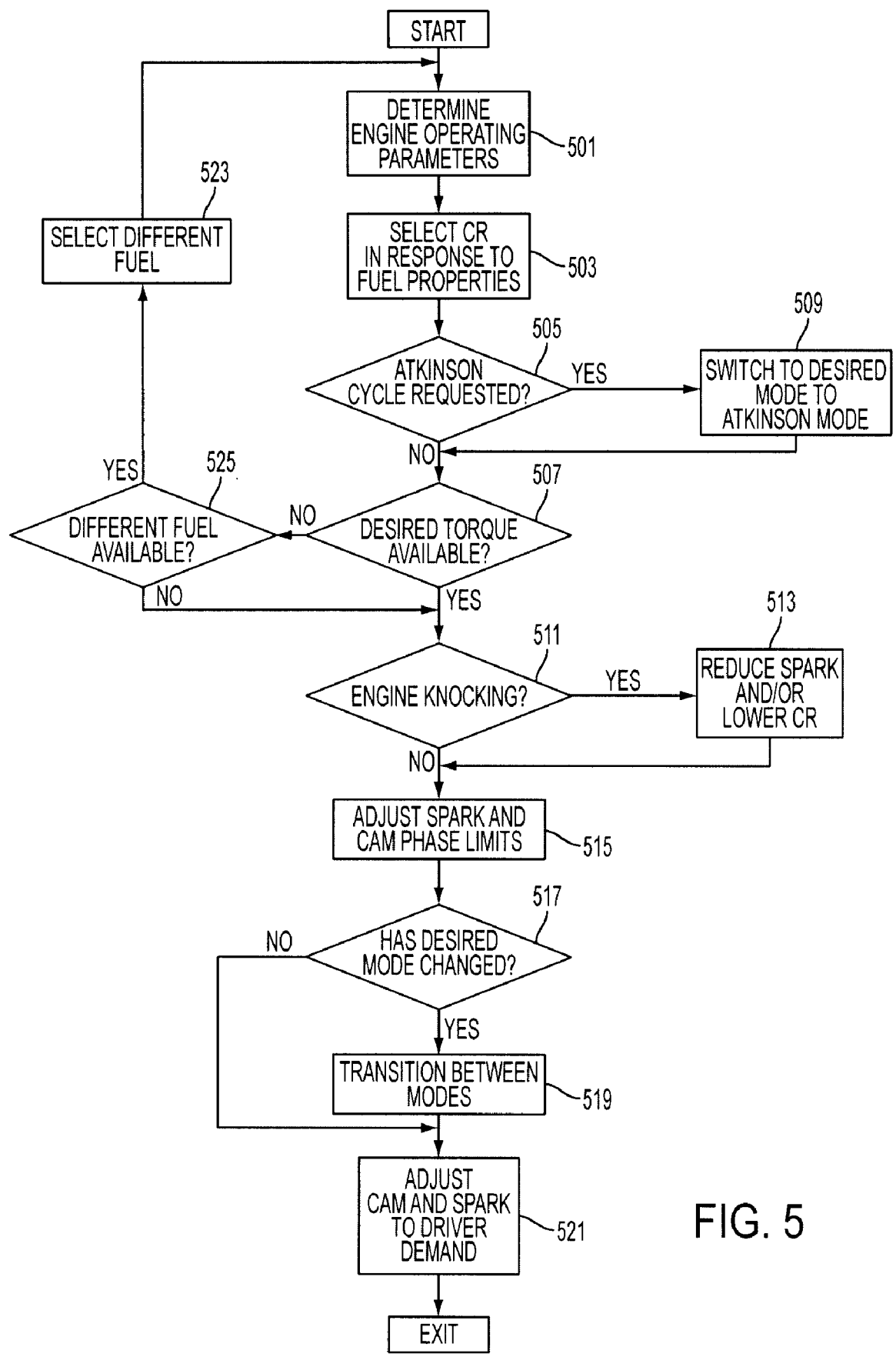
FIG. 5 is an example flow diagram showing a operational sequence for an engine that may be operated using multiple fuels.

Referring now to FIG. 5, a flow chart of an example strategy for operating an engine using multiple fuels is shown. In step 501, engine operating conditions are determined. Engine operating conditions may include but are not limited to the operator torque demand, engine temperature, barometric pressure, ambient air temperature, and fuel properties. The routine proceeds to step 503.

In step 503, the routine determines the desired compression ratio in response to fuel properties. The desired compression ratio can then be used to determine the initial cylinder cycle operating mode and valve timing.

In a first embodiment, the routine uses logic to determine if the engine is to operate in an Otto cycle or an Atkinson cycle. That is, the various engine operating conditions are evaluated to determine the desired state of cylinder operation. The routine can select the cylinder cycle in response to several operating parameters including an engine knock sensor, desired torque, and fuel properties. These operating conditions may be measured or inferred. This structure permits the system to operate with a single fuel tank that may contain a range of fuel mixtures or from multiple fuel tanks that contain different fuels.

In an alternative embodiment, in a system that injects different types of fuel from different injectors, the cylinder cycle mode can be based simply on the type of fuel being injected (e.g., a system that injects fuel from different sources, such as from a higher octane fuel injector and a lower octane fuel injector). By knowing the fuel type that is injected, the routine can simply select the cylinder mode that is appropriate for the injected fuel type. For example, if a higher octane fuel is directly injected into a cylinder, the routine can select Otto cycle with a 14:1 compression ratio. If the system is then switched over to a lower octane fuel, the cylinder cycle mode can be changed to Atkinson cycle with a 9:1 compression ratio, for example. In addition, if the fuel type is changed from a higher octane fuel to a lower octane fuel, then the amount of lower octane fuel injected to the cylinder may be less than the amount of higher octane fuel injected before the transition. The lower octane fuel amount may be reduced because a lower octane fuel may have a higher energy density than the higher octane fuel. Thus, to produce a given amount of torque, the amount of fuel injected can be decreased as the concentration of a lower octane fuel in the fuel increases.

In the above-mentioned first embodiment, the routine can use sensor information to determine or infer the fuel type and/or properties by using one of the above-mentioned methods or by another known method. The fuel type and/or properties may be used to index a table or function that contains empirically mapped engine data that describes the desired effective compression ratio for different fuels. If the fuel being delivered to the engine is not specifically described by the table or function, then the table or function can be interpolated so that the engine's effective compression ratio can be determined. Table entries are made so that the highest compression ratio that produces no engine knock or trace engine knock is entered in the table. The Otto cycle mode or the Atkinson cycle mode and valve timing are then selected in response to the desired effective compression ratio. Typically, the effective compression ratio can be varied more in the Atkinson cycle mode because there is a greater range of control over late intake valve closing time. Specifically, the intake valve timing can be retarded from bottom-dead-center of the intake stroke in response to fuel properties to reduce the effective compression ratio of a cylinder. For example, if the concentration of a lower octane fuel in a blended fuel that is comprised of lower octane fuel and a higher octane fuel increases, then the intake valve timing can be retarded to lower the effective compression ratio of the cylinder. This reduces the engine's propensity to knock as the fuel octane is varied. On the other hand, the intake valve timing can be advanced if the concentration of alcohol in the blended fuel increases.

The spark angle timing can also be adjusted in this step. If the concentration of alcohol in a fuel blend is increased the spark timing can be advanced because the fuel reduces the propensity to cause engine knock as the concentration of alcohol is increased. Conversely, the spark angle timing can be retarded as the concentration of a lower octane fuel in a fuel blend is increased. The spark timing may be adjusted in this manner by simply adding or subtracting angular degrees from a base spark command as the concentration of lower or higher octane fuels vary. This method can improve the energy utilization of the combusted fuel.

Further still, timing of the exhaust valves may be adjusted in this step. In certain operating conditions it may be desirable to advance or retard the exhaust valve timing in response to the fuel properties and/or the cylinder cycle mode. For example, if the concentration of a lower octane fuel in a blended fuel increases and the engine is operated in the Atkinson cycle mode, it may be desirable to delay the exhaust valve opening so that more of the cylinder pressure energy may be transferred to the piston before the exhaust valve is opened. Adjustable exhaust valve timing provides another degree of freedom to the present description. The routine proceeds to step 505.

In step 505, the routine determines if an Atkinson cylinder cycle is specifically desired. In certain circumstances, it may be desirable to operate an engine in an Atkinson cycle while it is possible to operate the engine at a higher compression ratio. For example, a hybrid vehicle may operate an engine at a substantially constant engine speed and load to recharge a battery and/or to supply a fraction of engine torque to the vehicle wheels. Accordingly, an engine fuel comprised of lower octane fuel, higher octane fuel, or a variable mixture of lower and higher octane fuels may be operated in the Atkinson cycle mode even though it is possible to operate the engine in a higher compression Otto cycle mode. Further, an Atkinson cycle mode may also be requested if an engine enters a specific speed/load range. In the Atkinson mode, the valve lift may be reduced and the valve opening time may be increased so that combustion stability is improved. Thus, it is possible to switch between Otto and Atkinson cycles even when an engine is operated with a single fuel. If an Atkinson mode has been requested the routine proceeds to step 509. Otherwise, the routine proceeds to step 507.

In step 509, the desired cylinder cycle mode is switched to an Atkinson mode. If an Atkinson cycle has been requested in response to specific engine operating conditions or in response to a request of an external system, then the cylinder is operated in an Atkinson mode and at a compression ratio that is predetermined from empirical testing using a fuel with similar properties. Specifically, the fuel properties are used to index a table that outputs valve timings and the routine proceeds to step 507.

In step 507, the routine determines if the desired torque is available in the presently selected desired cylinder cycle mode. The routine uses engine speed and fuel properties to index a table that contains empirically determined engine torque capacities. The engine torque capacities apply to an engine that is operated in the desired cylinder cycle mode, using fuel having similar properties, and at the present engine speed. The desired torque may be requested from an operator command or from an external system, such as a hybrid controller for example. If the engine is capable of producing the desired engine torque, the routine proceeds to step 511. If not, the routine proceeds to step 525.

In step 511, the engine determines if the engine is knocking at the present operating conditions. If the engine is knocking and if the engine torque request is steady or increasing, then the routine proceeds to step 513. Otherwise, the routine proceeds to step 515.

In step 513, adjustments are made to reduce engine knock. If the engine is knocking in the Otto cycle mode at a selected cam phase and spark advance then the spark angle can be retarded in an attempt to reduce the engine knock. But, if the engine continues to knock as spark is retarded, then the Atkinson cycle can be selected after the estimated engine efficiency is reduced by a predetermined amount.

If the engine is knocking in the Atkinson cycle mode at a selected cam phase and spark advance, then the spark can be further retarded to control the engine knock.

In one example, where a cylinder is operating in an Otto cycle mode and engine knock occurs, the spark is initially retarded. If engine knock continues, the cylinder can be switched to an Atkinson cycle mode where the cylinder's effective compression ratio is reduced. If the engine continues to knock, further compression ratio and spark adjustments may be made. The routine proceeds to step 515.

In step 515, the routine adjusts the cam advance and retard limits along with the spark advance and retard limits. Since the engine is capable of operating between a range of fuel mixtures (e.g., between 100% gasoline and 100% alcohol) the present method adjusts the cam timing and spark limits in accordance with the current fuel type and/or properties. For example, if the alcohol content of a gasoline based fuel increases by 10%, then the valve timing advance for an Atkinson cycle mode can be increased by 5°, thereby increasing the effective compression ratio of the engine. In other words, since the recently introduced alcohol reduces the fuel's susceptibility to cause engine knock, the engine compression ratio can be increased to improve engine output. The engine spark advance limit may be adjusted to accommodate the change in fuel type and/or properties as well. Thus, the cam phase retard and advance limits along with the spark advance are allowed to vary as the fuel type and/or properties vary. The specific cam timing and valve lift amounts are empirically determined and may be indexed by engine speed and engine load, for example.

In addition, the throttle opening amount or throttle plate position can be limited in response to the type of fuel being combusted by the cylinder. This control action can also be uses as a way to limit the amount of air inducted into a cylinder. By limiting the cylinder air charge, the amount of spark retard necessary to control engine knock may also be reduced. The routine proceeds to step 517.

In step 517, the routine determines if the desire cylinder cycle mode has changed. If so, the routine proceeds to step 519. If not, the routine proceeds to step 521.

In step 519, the cam, throttle plate angle, and spark are adjusted to change cycle modes and to reduce engine torque disturbances.

When the desired cylinder cycle changes from Atkinson cycle to an Otto cycle, the cam timing can be retarded and the spark advance angle may be increased. The cam can be retarded so that the cam profile can be switched to a higher lift profile at a cam position that allows less air to flow in the cylinder. This action can help to reduce the differences in cylinder air amount that may occur before and after the valve lift transition. In addition, the throttle opening may be reduced during the transition to further limit the engine torque during the transition. As the cam position is adjusted, the spark angle can be advanced, thereby increasing the engine torque and countering the effect of retarding the cam timing. Additional spark advance may be made possible by the newly introduced fuel's increased octane. The cam profile may be switched during or after the cam phase has been adjusted, but the transition is usually made after the cam phase has been changed so that the possibility of a torque disturbance is reduced. Engine torque may also be controlled during a cam profile change by retarding the spark angle, slipping the transmission torque converter clutch, and closing the throttle opening. The cam phase, throttle opening amount, and spark may be adjusted after the cam has switched profiles. See FIG. 6 for example.

The throttle plate position, cam phase, cam lift, spark advance, and torque converter clutch slippage may also be changed when transitioning from an Otto cycle to an Atkinson cycle. To begin the transition, the spark retard can be increased and the cam phase can be advanced. By advancing the cam phase, the amount of air that is inducted in to cylinder can be increased so that the mass of air entering the cylinder when the cam profile is switched is not substantially reduced. The spark angle can be retarded in response to a change in the fuel properties, thereby allowing the system to counteract at least a portion of the increase in cylinder air amount that may be caused by advancing the cam. The spark can be retarded to counter-act the change in cam phase. During the cam profile or lift amount transition, the spark advance can be increased and the throttle opening can be increased as the valve lift amount is decreased. These adjustments may be used to limit torque disturbances that may be caused by changing valve timing and lift.

The fuel timing may also be varied in this step as the cylinder cycle mode varies. In one embodiment, where fuel is injected directly into a cylinder, the starting or ending of the injection period may be changed as the cylinder cycle mode is changed. Further, the number of injections during a cylinder cycle may also be varied as the cylinder cycle mode varies. For example, when an engine is combusting a fuel having a higher concentration of alcohol, fuel injection may begin as the intake valve is opened and continue after the intake valve is closed. However, if the engine is operated in Atkinson mode and combusting a fuel with a higher concentration of lower octane fuel, then a first injection of fuel may begin some time after the intake valve opens. The first injection may be stopped after a specified time. And a second injection may commence after another specified period of time. The routine proceeds to step 521.

In step 521, the cam phase, exhaust valve timing, throttle opening amount, and spark angle may be adjusted in response to an operator or controller command. Typically, the valve timings that are determined in steps 503, 505, and 513 are used to maintain the desired compression ratio. However, it is also possible to change the effective compression ratio as the engine load changes. For example, if fuel properties are used in step 503 to determine a desired compression ratio of 13:1, step 521 can lower the effective compression ratio when the engine load is low, if desired. The throttle and spark advance can be controlled in accordance with known methods, such as, indexing tables based on engine speed and load, for example. The routine proceeds to exit.

In step 525, the routine determines if there is a different fuel available to combust in the cylinder. If there is a higher octane fuel available the routine proceeds to step 523. Otherwise, the routine proceeds to step 511. This step can be used in systems where there are multiple fuel sources and multiple fuel types (e.g., a system that can operate and inject alcohol and gasoline). Or, this step can be used in systems that can separate a blended fuel into a higher octane fuel and a lower octane fuel.

In step 523, the routine changes the desired fuel. By changing the fuel to a higher octane fuel, it may be possible to increase the cylinder pressure, by changing spark advance for example, without inducing engine knock. This can increase the torque produced by the cylinder and it may provide enough torque to meet the desired torque amount.

Note that the routine described by FIG. 5 is capable of changing cylinder cycle modes for individual cylinders, groups of cylinders, or for an entire engine.

Figure 6:
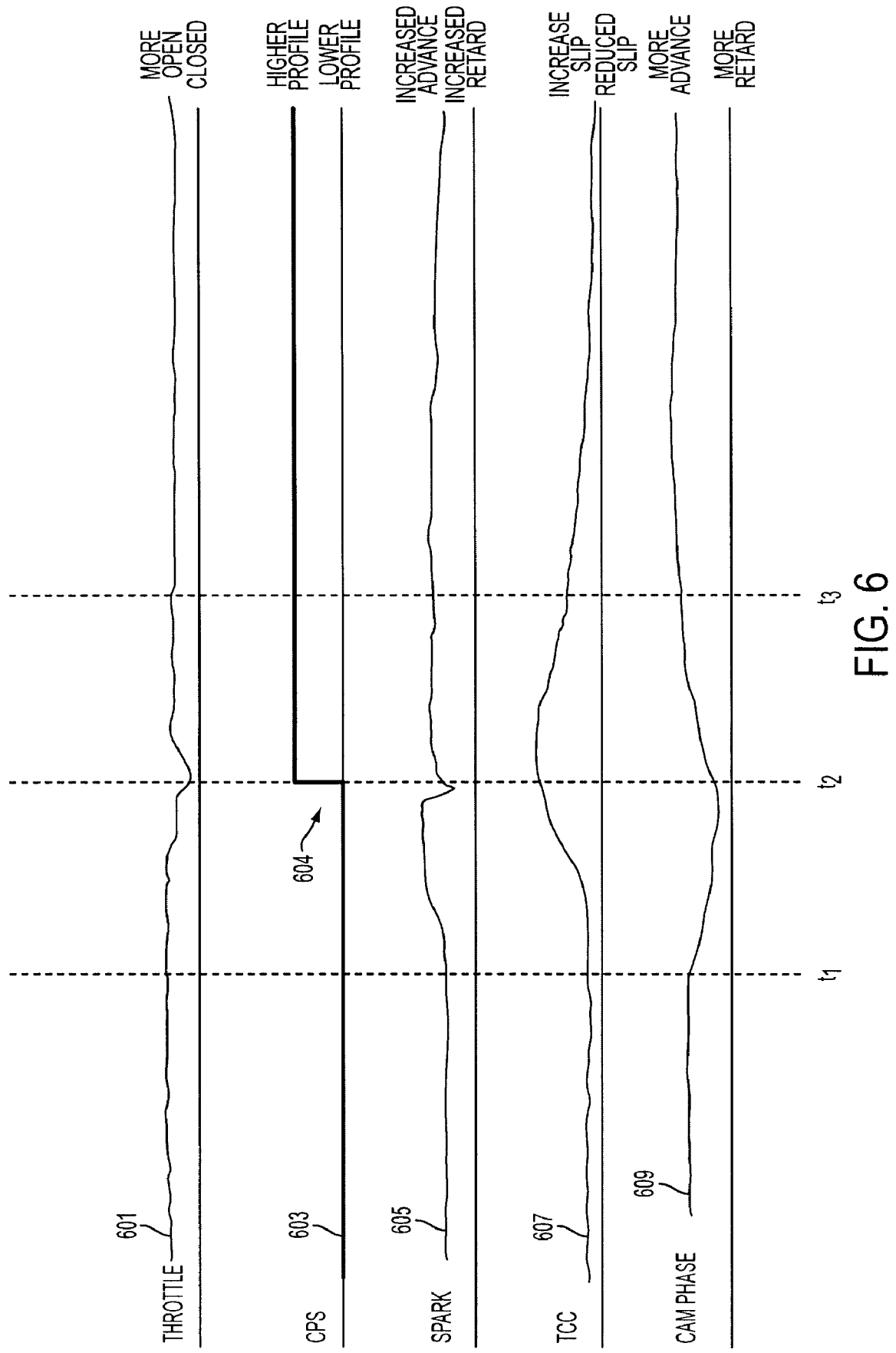
FIG. 6 is an example sequence showing the transition from Otto cycle to Atkinson cycle engine operation.

Referring now to FIG. 6, a plot of selected signals for an example transition from Atkinson cycle cylinder operation to Otto cycle cylinder operation is shown. The plot illustrates a cylinder cycle transition that is mentioned in the description of FIG. 5, step 519. The transitioning sequence begins at the left and flows to the right. The engine throttle plate position is represented by curve 601. A lower signal indicates closing the throttle more and a higher signal indicates opening the throttle more. Curve 603 identifies the state of the cam profile. The lower level indicates use of a lower lift cam lobe profile and the higher level indicates use of a higher lift cam lobe profile. Note that the signal does not necessarily represent that all cylinders are simultaneously switched to the higher lift cam lobe profile. Some cam profile switching devices switch the cam profiles when the cam is on the base circle portion of the cam. Therefore, the cam profile switch described by curve 604 is used for illustration purposes and is not intended to limit or reduce the scope of the present description. Curve 605 represents the spark angle advance where a higher signal represents more spark advance and a lower signal represents more spark retard. Curve 607 represents the amount of torque converter clutch slippage. The higher portion of the signal represents more slippage while the lower portion of the signal represents less slippage. Curve 609 represents cam phase. The higher portion of the signal represents increased cam advance while the lower portion of the signal represents increased cam retard.

Vertical markers $t_1$, $t_2$, and $t_3$ represent different times during a cylinder cycle mode change. The $t_1$ marker represents the cycle transition initiation. At this point, the cam phase begins to retard, the torque converter begins to slip, and the spark begins to advance. The cam is retarded to reduce the amount of air entering the cylinder while the spark is advanced to increase the torque produced by the cylinder.

Therefore, when the cam profile is switched the change in the inducted air amount is somewhat limited by the retarded cam. However, the spark can be retarded to compensate for any additional torque that is produced by the air entering the cylinder when the profile is actually switched.

The cam profile switch occurs at $t_2$. Prior to and after the profile switch the throttle and spark are adjusted to reduce any torque disturbance that may be started by switching cam profiles. The spark advance and throttle opening amount are reduced so that the additional torque that is produced by inducting additional air into the cylinder can be mitigated.

The $t_3$ marker indicates that the transition is substantially complete and that controller 12 may make adjustments to the cam phase, throttle position, spark timing, and torque converter clutch slippage to accommodate operator demands.

Figure 7:
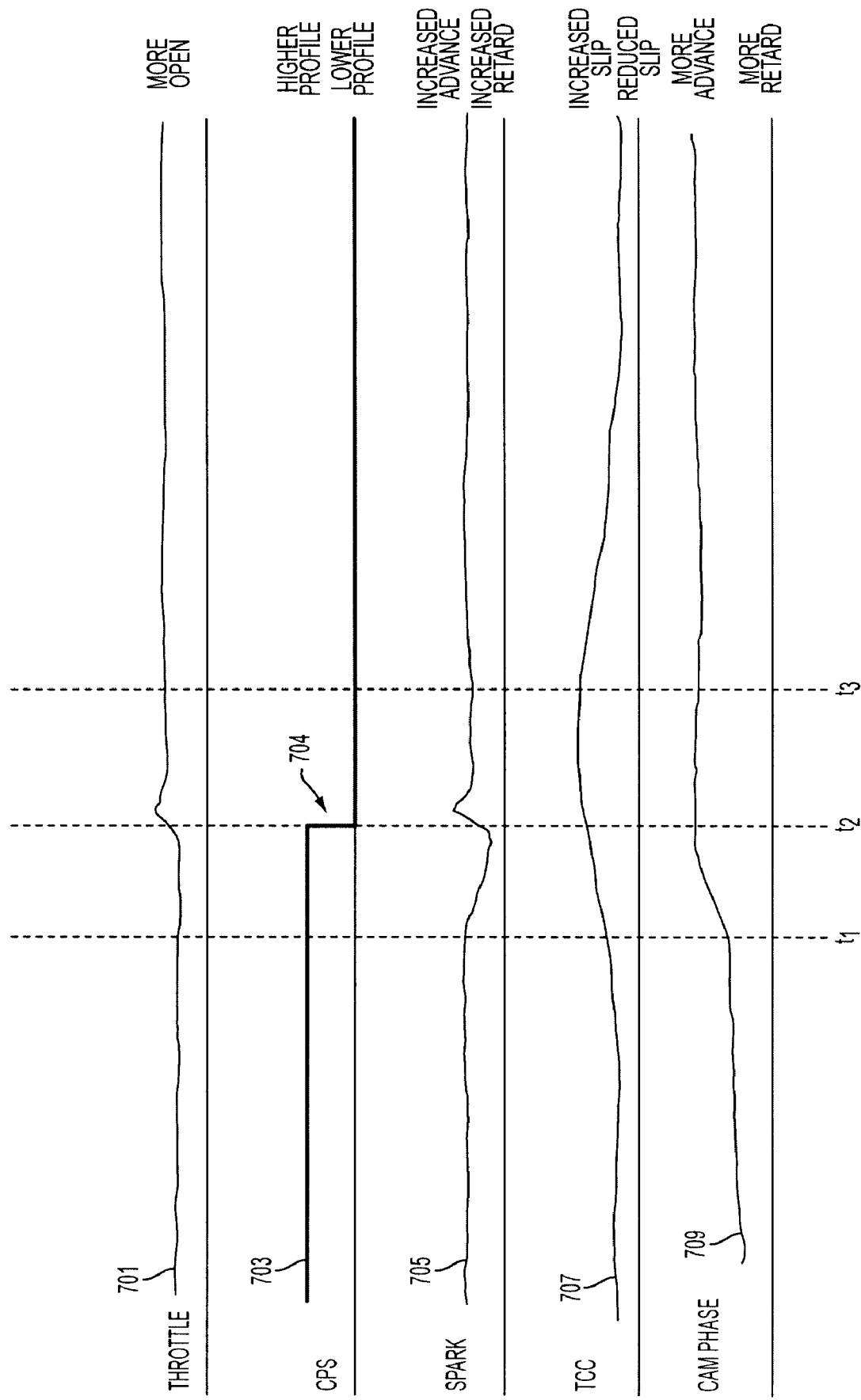
FIG. 7 is an example sequence showing the transition from Atkinson cycle to Otto cycle engine operation.

Referring now to FIG. 7, a plot of selected signals for an example transition from Otto cycle engine operation to Atkinson cycle engine operation is shown. The sequence and signals are similar to those illustrated in FIG. 6. Curve 701 represents the throttle plate position, curve 703 represents the cam profile switch indication, curve 705 represents the spark angle, curve 707 represents the torque converter clutch slippage, and curve 709 represents the cam phase.

The transition is initiated at $t_1$ where the cam phase is increased, the spark angle is retarded, and the torque converter clutch slippage is increased. By advancing the cam phase and retarding the spark, additional air is allowed to flow into the cylinder so that the change in cylinder air amount during the profile transition can be compensated. The torque that may be developed from the additional air can be mitigated by adjusting the spark retard.

The transition from Otto cycle to Atkinson cycle occurs at marker $t_2$. About this marker, the throttle and spark advance are quickly adjusted to compensate for torque reduction that occurs when air entering the engine cylinders is reduced. Specifically, the throttle is opened more to increase the intake manifold pressure, thereby allowing additional air to flow to the cylinder, and the spark advance is increased to increase the engine torque.

At $t_3$ the transition is substantially over and the throttle, spark timing, cam phase, and torque converter clutch can be adjusted in response to operator demands.

Note that the above description contemplates a base cam position where the cam is advanced and may be retarded there from. However, the base cam position could also be set at a retarded angle and then the cam could be advanced from this location. As such, the specific cam timings mentioned in this description are meant for illustration purposes and are not intended to limit the scope or breadth of the description.

Figure 8:
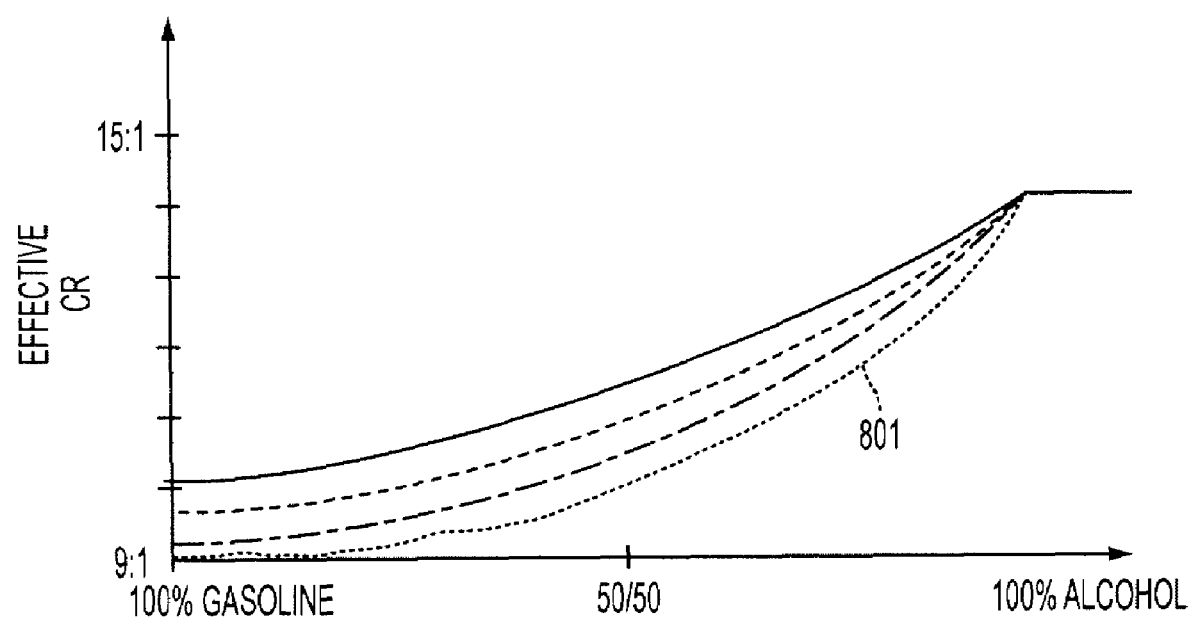
FIG. 8 is an example switching profile for switching between Otto cycle operation and Atkinson cycle operation in response to the alcohol concentration of a fuel.

Referring now to FIG. 8, an example plot of a function that describes a desired effective compression ratio versus concentration of alcohol in a fuel is shown. This function may be used in step 503 of FIG. 5 to select a desired compression ratio. The right side of the x-axis represents a gasoline mixture while the left side represents an alcohol mixture. The y-axis begins at a 9:1 compression ratio and goes to 15:1. Curve 801 illustrates that the desired compression ratio increases with the concentration of alcohol in the fuel.

As will be appreciated by one of ordinary skill in the art, the routines described in FIG. 3-5 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, gaseous fuels, or alternative fuel configurations could use the present description to advantage.

The invention claimed is:

1. A method for controlling combustion of different fuels in an internal combustion engine, the method comprising:
   increasing the amount of valve closing timing retard of an intake valve during a cycle of a cylinder in response to the concentration of a lower octane fuel increasing in a fuel that is combusted in said cylinder, said valve closing time retarded from at least bottom-dead-center of the intake stroke of said cylinder, said lower octane fuel being gasoline; and
   limiting the opening amount of a throttle as said gasoline concentration in said fuel increases.

2. The method of claim 1 wherein said fuel is a mixture of gasoline and alcohol.

3. A method for controlling combustion of different fuels in an internal combustion engine, the method comprising:
   increasing the amount of valve closing timing retard of an intake valve during a cycle of a cylinder as the concentration of a lower octane fuel increases in a fuel that is combusted in said cylinder, said valve closing time retarded from at least bottom-dead-center of the intake stroke of said cylinder; and
   decreasing the lift of said intake valve in response to an increase of said lower octane fuel concentration in said fuel.

4. A method for controlling combustion of different fuels in an internal combustion engine, the method comprising:
   increasing the amount of valve closing timing retard of an intake valve during a cycle of a cylinder as the concentration of a lower octane fuel increases in a fuel that is combusted in said cylinder, said valve closing time retarded from at least bottom-dead-center of the intake stroke of said cylinder; and
   decreasing the amount of said fuel as the concentration of said lower octane fuel increases in said fuel.

5. A system for operating an engine using different fuels, the system comprising:
   a valve timing change apparatus for retarding the closing time of an intake valve after bottom-dead-center of an intake stroke, said intake valve operable in a cylinder of an internal combustion engine;
   a sensing apparatus for determining properties of a fuel;
   an apparatus to change the lift of said valve; and
   a controller that commands said valve timing change apparatus to increase the amount of intake valve closing retard in response to said sensing apparatus responding to a higher concentration of a lower octane fuel that is present in a fuel that is combusted in said cylinder, and commands said apparatus that changes the lift of said valve in response to said concentration of said lower octane fuel, including to decrease the lift of said valve in response to an increase in the concentration of gasoline combusted in said cylinder.

6. The system of claim 5 further comprising an apparatus for changing the spark timing of said cylinder in response to said concentration of said lower octane fuel.

7. The system of claim 5 further comprising an exhaust valve timing apparatus for changing the timing of an exhaust valve as said concentration of said lower octane fuel vanes.

8. The system of claim 7 wherein said exhaust valve timing apparatus retards the exhaust valve opening time as said concentration of said lower octane fuel increases.

9. A system for operating an internal combustion engine using different fuels, the system comprising:
   a cylinder having a valve that can be operated to regulate flow between said cylinder and an intake manifold; and
   a controller for operating said engine in a first mode, said first mode comprising a first valve timing that produces an effective compression ratio that is less than 11:1, a second mode, said second mode comprising a second valve timing that produces an effective compression ratio of at least 12.5:1, said second valve timing being more advanced than said first valve timing, said second valve timing being an intake valve closing timing, said controller selecting between said first mode and said second mode when at least a property of the fuel being combusted in said engine changes.

10. The system of claim 9 wherein said controller selects said second mode when said property is a concentration of at least 40% alcohol in said fuel.

11. The system of claim 9 wherein said second valve timing produces an effective compression ratio that is greater than 13.5:1.

12. The system of claim 9 further comprising an injector that injects fuel directly into said cylinder and that is commanded by said controller to vary the beginning or end of injection as said controller changes between said first and said second modes.

13. The system of claim 9 wherein said controller operates said engine in said first mode during a start.

14. The system of claim 9 wherein said controller commands said first mode before said engine is stopped.

15. The system of claim 9 wherein said controller adjusts the valve timing to vary the effective compression ratio of said cylinder as said at least a property of said fuel vanes.

* * * * *